(12) United States Patent
Lampe et al.

(10) Patent No.: US 9,569,938 B1
(45) Date of Patent: Feb. 14, 2017

(54) VIDEO CONTENT ANALYSIS USING POINT OF SALE DATA

(75) Inventors: Charles Gregory Lampe, Silver Spring, MD (US); James Craig Moran, Annapolis, MD (US); Waleed Kouncar, Québec (CA)

(73) Assignee: VERINT AMERICAS INC., Alpharetta, GA (US)

(*) Notice: Subject to any disclaimer, the term of this patent is extended or adjusted under 35 U.S.C. 154(b) by 78 days.

(21) Appl. No.: 13/315,764

(22) Filed: Dec. 9, 2011

Related U.S. Application Data (60) Provisional application No. 61/422,203, filed on Dec. 12, 2010.

(51) Int. Cl.
  *G06Q 20/00* (2012.01)
  *G08B 21/00* (2006.01)
  *G07G 1/00* (2006.01)

(52) U.S. Cl.
  CPC .................. *G07G 1/0018* (2013.01)

(58) Field of Classification Search
  USPC ............................................ 705/16; 340/540
  See application file for complete search history.

(56) References Cited

U.S. PATENT DOCUMENTS

| | | | |
|---|---|---|---|
| 4,991,008 A * | 2/1991 | Nama ............................ | 348/150 |
| 5,767,496 A * | 6/1998 | Swartz et al. ............. | 235/462.1 |
| 7,806,316 B1 * | 10/2010 | Torres et al. ................. | 235/379 |
| 8,355,992 B1 * | 1/2013 | Haugh ............................ | 705/64 |
| 8,570,375 B1 * | 10/2013 | Srinivasan et al. ........... | 348/150 |
| 2003/0098910 A1 * | 5/2003 | Kim ............................... | 348/150 |
| 2004/0155960 A1 * | 8/2004 | Wren ....................... | G07G 1/14 348/150 |
| 2004/0238629 A1 * | 12/2004 | Buchholz ........... | G06K 7/10861 235/383 |
| 2006/0248028 A1 * | 11/2006 | Tedesco ............... | G08B 13/196 706/14 |
| 2007/0057049 A9 * | 3/2007 | Kundu et al. ................. | 235/383 |
| 2008/0210754 A1 * | 9/2008 | Lovett ................... | G06Q 20/24 235/380 |
| 2009/0039165 A1 * | 2/2009 | Collins et al. ........... | 235/462.41 |
| 2010/0030698 A1 * | 2/2010 | Goodin .......................... | 705/76 |
| 2010/0114617 A1 * | 5/2010 | Bobbitt et al. .................... | 705/7 |
| 2011/0063108 A1 * | 3/2011 | Aonuma ............ | G06Q 20/4016 340/540 |
| 2011/0188701 A1 * | 8/2011 | Bobbitt et al. ................ | 382/100 |
| 2012/0321146 A1 * | 12/2012 | Kundu et al. ................. | 382/118 |

* cited by examiner

*Primary Examiner* — Ariel Yu (74) *Attorney, Agent, or Firm* — Meunier Carlin & Curfman (57) ABSTRACT

In an embodiment, a method of performing video content analysis using transactional data is provided. The method comprises identifying and receiving the transactional data and a segment of video corresponding to a transaction, integrating the transactional data with the segment of video, and analyzing the integrated video to determine an action to take in relation to the transaction.

6 Claims, 6 Drawing Sheets

VIDEO CONTENT ANALYSIS USING POINT OF SALE DATA

RELATED APPLICATIONS

This non-provisional patent application is related to and claims priority to U.S. Provisional Patent Application No. 61/422,203, entitled "Video Content Analysis Using Point of Sale Data," filed on Dec. 12, 2010, which is hereby incorporated by reference in its entirety.

TECHNICAL FIELD

Aspects of the invention are related to the field of image content analysis, and in particular, analysis of image content relating to business and retail transactions.

BACKGROUND

Video systems are often used to monitor and record business transactions. Business transactions involving the exchange of cash, financial instruments, or products are of particular interest because there may be opportunity for fraud, theft, or other behavior which may need to be documented or investigated. The presence of the video system may deter these behaviors to some extent and the availability of video documentation assists in the identification, investigation, and resolution of incidents. The availability of video may also assist with training, coaching, and employee performance evaluation.

Many business and retail transactions occur with the aid of a Point of Sale (POS) terminal. The POS terminal manages the selling or transaction process and may or may not require involvement of a salesperson, cashier, or representative to complete the transaction with the customer. A retail POS system may include a computer, display, cash drawer, credit card reader, printer, barcode scanner, scale, signature capture pad, or other devices. POS terminals are typically connected to a central POS computer which performs other functions including pricing, inventory, gathering sales information, reporting, and interfacing to other systems.

Overview

Disclosed are methods and software that, as described herein, provide for performing video content analysis using transactional data.

In an embodiment, a method comprises identifying and receiving transactional data and a segment of video corresponding to a transaction, integrating the transactional data with the segment of video, and analyzing the integrated video to determine an action to take in relation to the transaction.

In an embodiment, a computer readable medium having stored thereon program instructions that, when executed by a video processing system to perform video content analysis using transactional data, direct the video processing system to identify and receive the transactional data and a segment of video corresponding to a transaction, integrate the transactional data with the segment of video, and analyze the integrated video to determine an action to take in relation to the transaction.

In an embodiment, the transactional data comprises at least one of business or retail data.

In an embodiment, the transactional data comprises at least one of the following: when a transaction starts, when a transaction ends, an amount of a transaction, a number of items transacted, an identity of parties to a transaction, product identification information, an account number, a type of items transacted, or a type of payment.

In an embodiment, the transactional data is integrated such that it is visually present in or associated with the segment of the video when the integrated video is processed or viewed.

In an embodiment, integration is accomplished by an integration system.

In an embodiment, analysis of the integrated video is accomplished by a video analysis system.

In an embodiment, the analysis is conducted to accomplish at least one of the following: detect fraud, improve business processes, verify policy compliance, perform employee training, or investigate accidents.

In an embodiment, the analysis of the integrated video indicates a discrepancy between the transactional data and the segment of video and the action taken is a transmission of an alert.

In an embodiment, the segment of video is coupled with audio information.

In an embodiment, the integrated video is stored in a video storage system configured to allow for retrieval for analysis and processing purposes.

DETAILED DESCRIPTION

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

Figure 1:
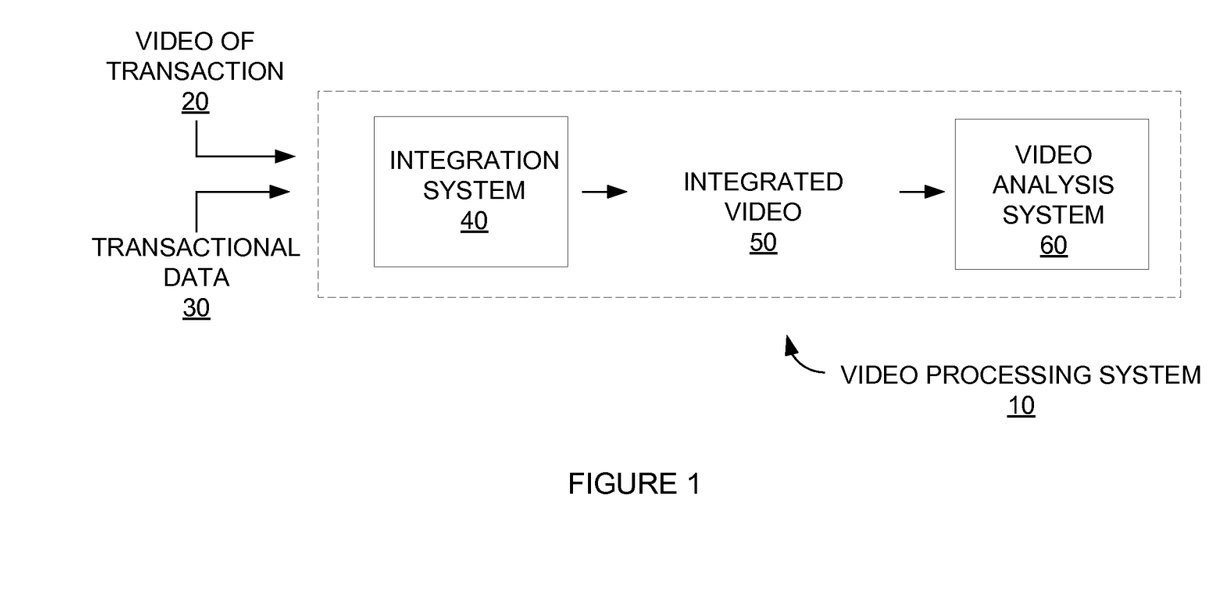
FIG. 1 illustrates an integration of video and transactional data for analysis.

FIG. 1 illustrates an integration of video and transactional data for analysis. Video of transaction 20 and transactional data 30 are sent to video processing system 10. In the present figure, video processing system 10 contains integration system 40, integrated video 50, and video analysis system 60. Integration system 40 produces integrated video 50 which is used for transactional analysis by video analysis system 60. Transactions could include business transactions, retail transactions, financial transactions, and so forth.

Video of transaction 20 may be captured by video sources (not shown) including video cameras, still cameras, internet protocol (IP) cameras, video switches, video buffers, video servers, or other video transmission devices, including combinations thereof. Video of transaction 20 is then transmitted to video processing system 10. Video of transaction 20 may be video or still image.

Transactional data 30 may be captured by a number of devices (not shown) including computers, displays, cash registers, cash drawers, automatic teller machines (ATM), card readers, printers, barcode scanners, scales, signature capture pads, or other devices. Transactional data 30 is then transmitted to video processing system 10. Transactional data 30 may include data indicating when a transaction starts, when a transaction ends, the type of payment processed, the amount of the transaction, the number of items transacted, the identities of the parties, bar codes or other product identification information, account numbers, the types of items transacted, type of payment, or other data.

Video processing system 10 processes transactional data 30 and integrates it with video of transaction 20. Video processing system 10 is capable of performing one or more types of analysis on the integrated video. In FIG. 1, video processing system 10 includes integration system 40 and video analysis system 60. However, video processing system 10 may comprise one system capable of both integrating and analyzing video of transaction 20 and transactional data 30.

Video processing system 10 comprises processing circuitry and an interface for receiving video and data. Video processing system 10 may also comprise an additional interface for receiving other data, an additional interface for transmitting video, user interface, memory, software, communication components, power supply, or structural support. Video processing system 10 may be a server, image processing equipment, computing system, application specific circuitry, or some type of processing device, including combinations thereof.

Integration system 40 processes transactional data 30 and integrates it with video of transaction 20 to produce integrated video 50. Transactional data 30 is integrated such that it is visually present in or associated with video of transaction 20 when integrated video 50 is processed or viewed.

Video analysis system 60 performs analysis using integrated video 50. Video analysis system 60 analysis accomplishes or aids the processes of detecting fraud, improving business processes, verifying compliance, performing employee coaching or training, investigating incidents, or for other purposes. Video analysis system 60 may comprise any device for processing video, video streams, or images. Video analysis system 60 comprises processing circuitry and an interface for receiving video. Video analysis system 60 is capable of performing one or more types of analysis on the integrated video. Video analysis system 60 may also comprise an additional interface for receiving other data, an additional interface for transmitting video, user interface, memory, software, communication components, power supply, or structural support. Video analysis system 60 may be a video processing system, image processing equipment, server, computing system, application specific circuitry, or some type of processing device, including combinations thereof.

Figure 2:
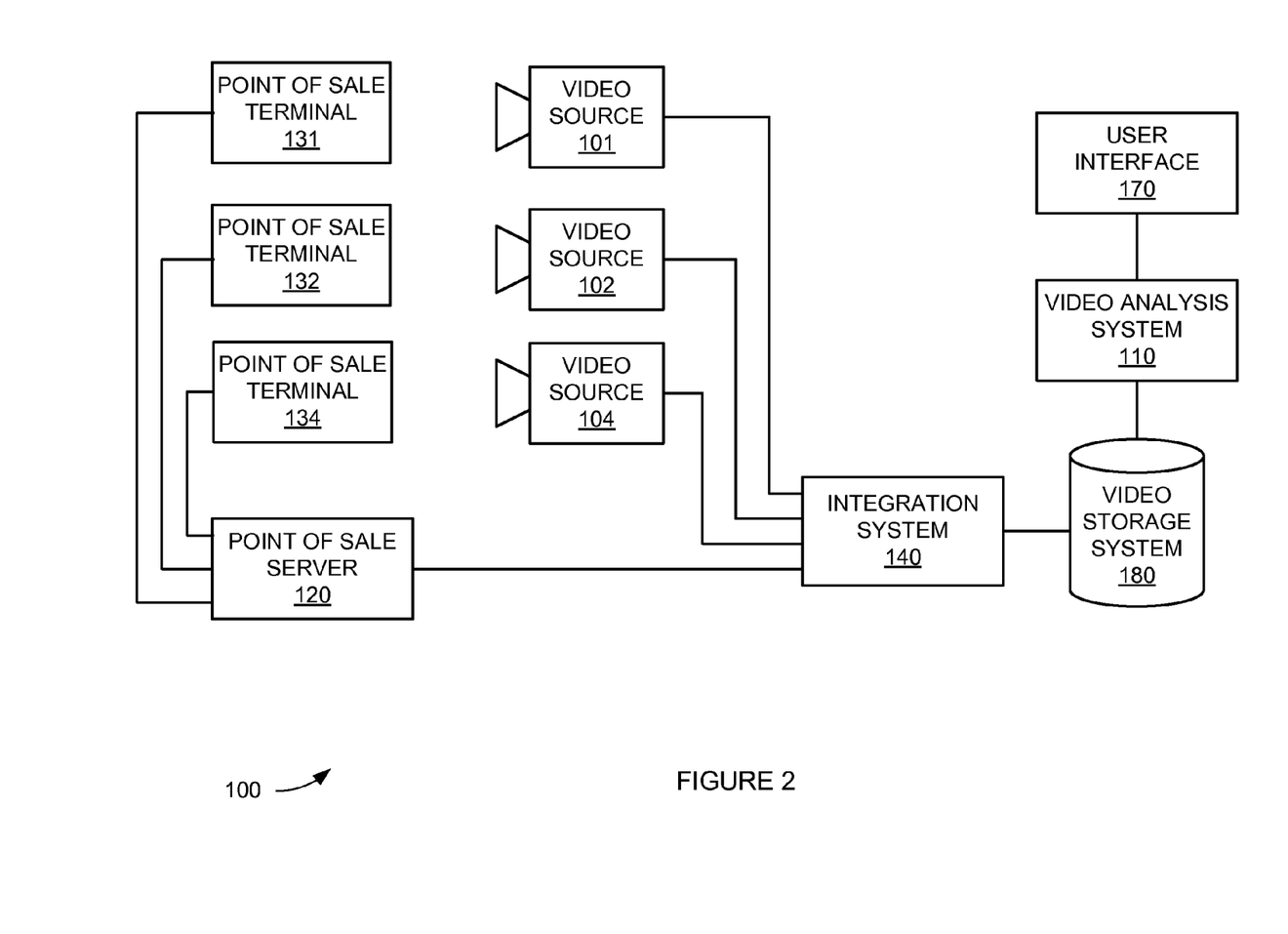
FIG. 2 illustrates a video system.

FIG. 2 illustrates video system 100. Video system 100 comprises video sources 101-104, point of sale (POS) terminals 131-134, POS server 120, integration system 140, video storage system 180, video analysis system 110, and user interface 170. Integration system 140 receives video from one or more of video sources 101-104 and the POS data from POS server 120. Integration system 140 integrates the POS data into the video and stores the integrated video in video storage system 180. Video analysis system 110 performs analysis on the integrated video retrieved from video storage system 180.

Figure 3:
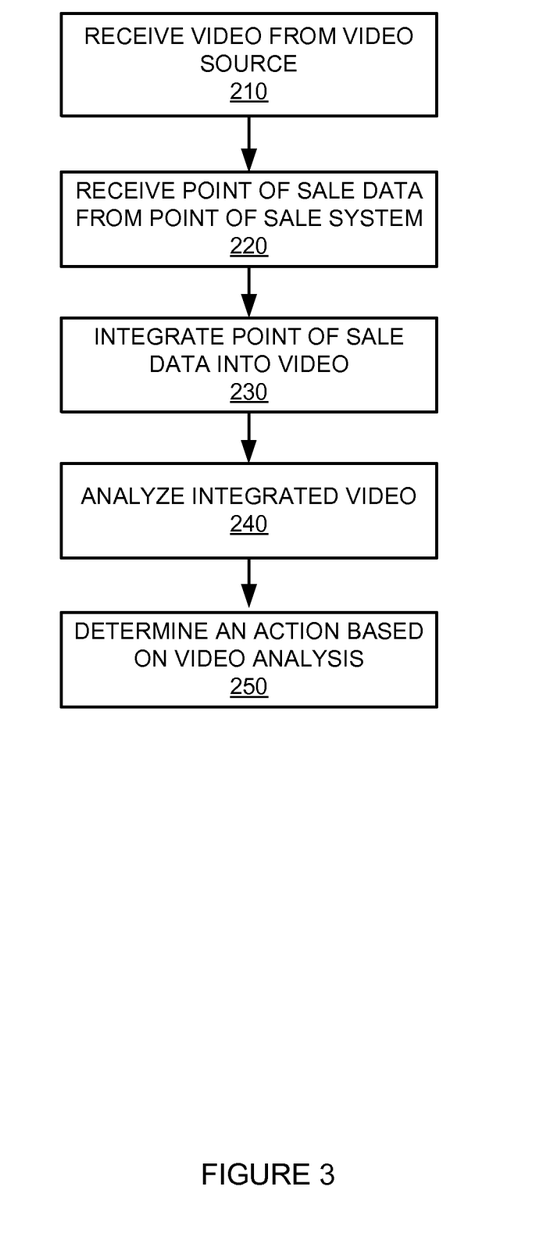
FIG. 3 illustrates an operation of a video system.

FIG. 3 illustrates an operation of video system 100. The steps of the operation are indicated below parenthetically. Integration system 140 receives video from video source 101 (210). Integration system 140 also receives POS data from POS terminal 131 through POS server 120(220). Integration system 140 integrates the POS data into the video (230). Video analysis system 110 analyzes the integrated video (240). Video analysis system 110 then determines an action based on the analysis (250).

Referring back to FIG. 2, video sources 101-104 may comprise any device having the capability to capture video or images. Video sources 101-104 comprise circuitry, and an interface for transmitting the video or images. Video sources 101-104 may be the devices which performs the initial optical capture of the video images or may be intermediate transfer devices. For example, video sources 101-104 may be video cameras, still cameras, internet protocol (IP) cameras, video switches, video buffers, video servers, or other video transmission devices, including combinations thereof.

Video analysis system 110 may comprise any device for processing video, video streams, or images. Video analysis system 110 comprises processing circuitry and an interface for receiving video. Video analysis system 110 is capable of performing one or more types of analysis on the integrated video. Video analysis system 110 may also comprise an additional interface for receiving other data, an additional interface for transmitting video, user interface, memory, software, communication components, power supply, or structural support. Video analysis system 110 may be a video processing system, image processing equipment, server, computing system, application specific circuitry, or some type of processing device, including combinations thereof.

POS server 120 and POS terminals 131-134 operate together to perform business or retail transactions. POS terminals 131-134 may include a computer, display, cash register, cash drawer, automatic teller machine (ATM), card reader, printer, barcode scanner, scale, signature capture pad, or other devices. One typical example of POS terminal 131-134 is the set of equipment and software at a retail checkout stand which is configured to read bar codes, total purchases, and process payments. POS server 120 comprises a processing system and a communication interface. POS server 120 provides data to POS terminals 131-134, receives transaction data from POS terminals 131-134, and interfaces with other systems. POS server 120 may also comprise additional interfaces for transmitting or receiving data, power supply, software, or structural support.

In a typical application, each of the checkout lanes or customer service windows at a retail operation has one or more of POS terminals 131-134. The cashier, salesperson, or customer service representative processes purchases, returns, or other business transactions using the POS terminal, and provides a receipt or documentation. POS server 120 performs support functions including looking up prices, processing credit card payments, accessing accounts, updating inventory, computing taxes, determining club membership status, as well as other functions. In other applications, one party may perform the entire transaction while interacting with an automated POS terminal and no other party is involved. Examples of this latter type of application are an ATM machine, an automated self pay gasoline pump, a vending machine, or a self checkout station in a retail store.

POS server 120 typically maintains electronic records of data about each transaction but has no visual or video record of the interaction which took place between the two parties or between the single party and the machine. Video sources 101-104 monitor POS terminals 131-134 and the area or scene where transactions take place. Video sources 101-104 provide video streams or images of the scenes to integration system 140. Integration system 140 also receives transaction data from POS server 120. The data from POS server 120 may include data indicating when a transaction starts, when a transaction ends, the type of payment processed, the amount of the transaction, the number of items transacted, the identities of the parties, bar codes or other product identification information, account numbers, the types of items transacted, type of payment, or other data.

Integration system 140 processes the transaction information from POS server 120 and integrates into the video or images received from video sources 101-104. The POS data is integrated such that it is visually present in or associated with the video when the video is processed or viewed. Integration system 140 stores the integrated video in video storage system 180. Video analysis system 110 is then able to retrieve the integrated video for analysis and processing purposes. Analyzing video which contains both the video of the interaction with the transaction data from the POS system allows video analysis system 110 to perform analysis which accomplishes or aids the processes of detecting fraud, improving business processes, verifying compliance, performing employee coaching or training, investigating incidents, or for other purposes.

Figure 4:
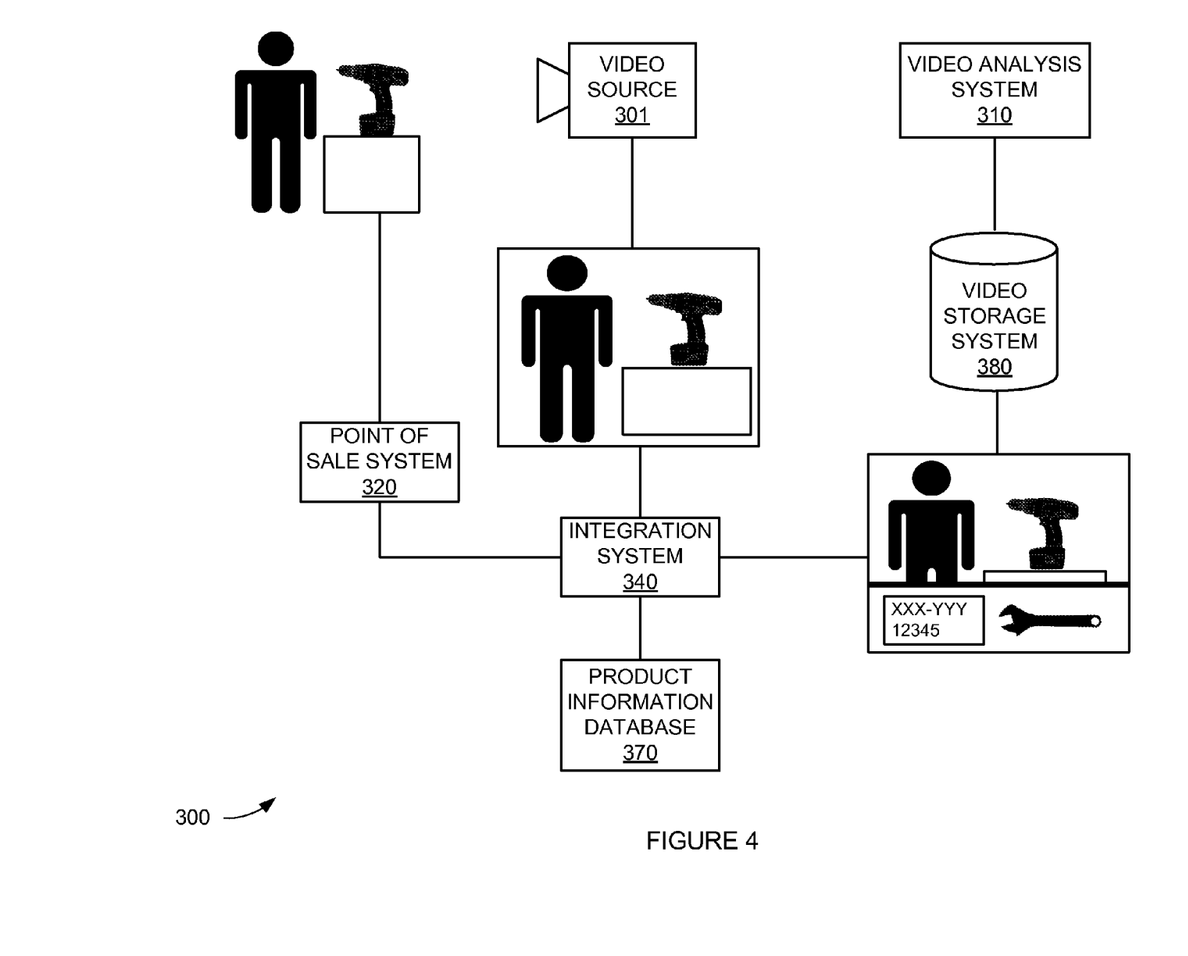
FIG. 4 illustrates a video system which performs video content analysis using POS data.

FIG. 4 illustrates video system 300. Video system 300 is an example of video system 100 although video system 100 may have alternate configurations or operate in alternate manners. FIG. 3 illustrates the use of video system 300 in an application which performs video content analysis using POS data. In this example, video analysis system 310 detects product bar code discrepancies at purchase locations, return locations, or other product processing locations. Bar code discrepancies may occur because a bar code was misread, because a barcode has been altered, because a barcode is not properly associated with the right product in a lookup database, or for other reasons.

In FIG. 4, a customer is purchasing a drill at a retail POS terminal. The POS terminal may be operated by a store associate or may be a self checkout POS terminal. POS system 320 controls, provides information to, and receives information from the transaction. The bar code on the drill or the drill package is scanned or entered at the POS terminal and POS system 320 provides the price associated with the barcode to the POS terminal.

As the transaction is taking place, video source 301 captures video or still images of the transaction and the scene at the POS terminal. Integration system 340 receives the video or images of the transaction as well as POS data from POS system 320. In this example, the data provided by POS system 320 includes the bar code or other product identification information for the drill. However, POS system 320 may provide many additional types of information about the transaction as well.

Using the bar code information, integration system 340 retrieves additional information about the product associated with the barcode from product information database 370. In this case, product information database 370 is providing an image of the product associated with the bar code. However, product information database 370 may provide other types of information about the product as well including weight, identification numbers, package types, or other information.

Integration system 340 integrates the retrieved product information into the video of the transaction. In this example, the bar code which was processed is actually associated with a wrench. Integration system 340 integrates or embeds an image of the wrench retrieved from product information database 370 into the video as illustrated in FIG. 4. Other types of information associated with the product or transaction may also be embedded in the video. The additional information may include a customer number, a customer name, a transaction number, a date, a time, a purchase amount, or other information. Integration system 340 stores the integrated video in video storage system 380.

Video analysis system 310 retrieves the integrated video from video storage system 380 and performs analysis on the integrated video. In this example, video analysis system 310 performs analysis between the picture of the product purchased and the picture of the product which is associated with the product the customer was charged for. In this case, video analysis system 310 uses one or more image processing techniques or algorithms to determine that the item possessed by the customer, the drill, is not the same as the item that the customer was charged for, the wrench. This could be because the bar code was misread, because the barcode has been altered, because the barcode is not properly associated with the right product in the POS system, because a store associate entered the purchase incorrectly, because a fraud is being committed, or for other reasons.

Figure 5:
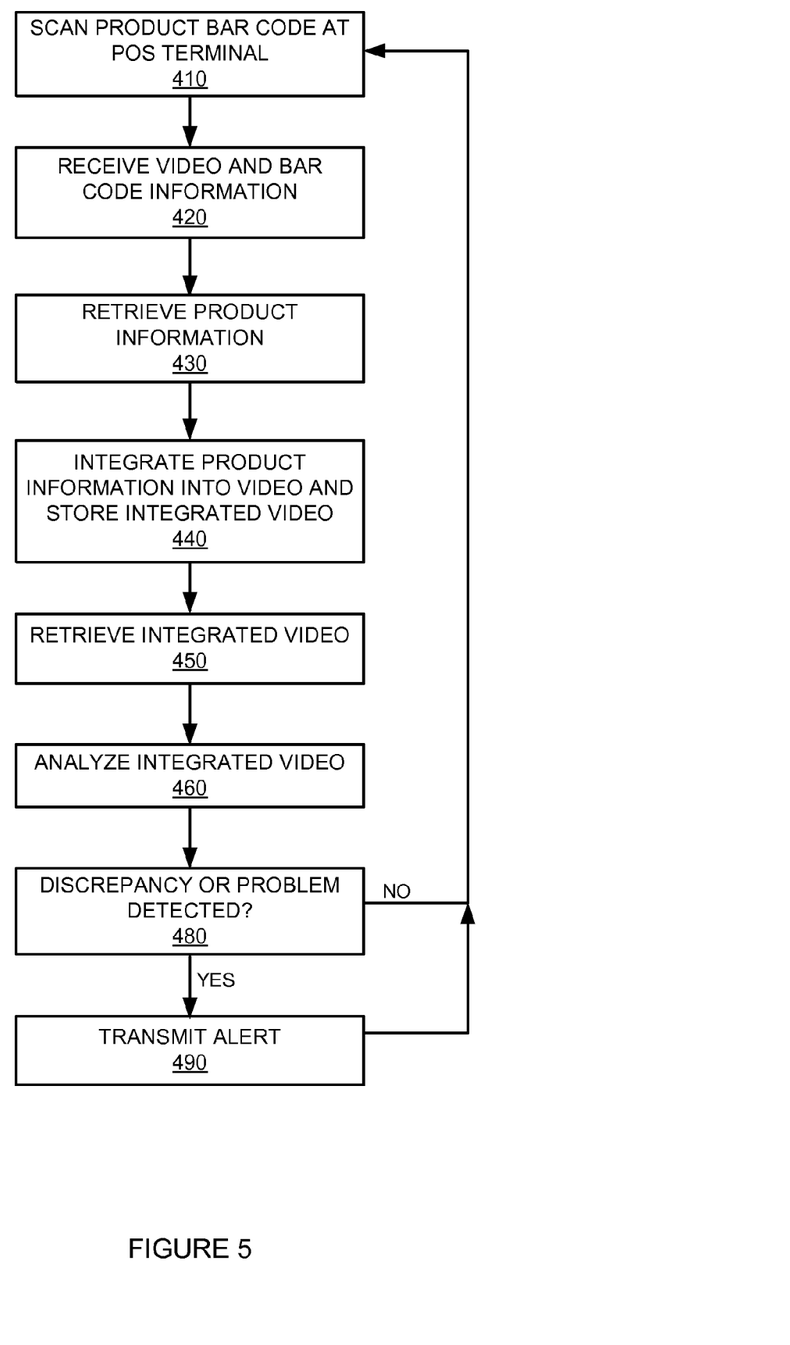
FIG. 5 illustrates an operation of a video system which performs video content analysis using POS data.

FIG. 5 illustrates an example method of operation of video system 300 which performs video content analysis using POS data. The steps of FIG. 5 are indicated parenthetically in the description below. The bar code on a product is scanned at a POS terminal (410). Integration system 340 receives video of the transaction and the bar code information from POS system 320 (420). Integration system 340 retrieves product information, including an image of the product associated with the bar code, from product information database 370 (430). Integration system 340 integrates the product information into the video and stores the integrated video in video storage system 380 (440).

Video analysis system 310 retrieves the integrated video from video storage system 380 (450) and analyzes the integrated video (460). One purpose of the analysis is to look for discrepancies between what occurs or is seen in the video and the POS information embedded in the video. If a discrepancy is detected in the information contained in the video or some other type of problem with the transaction is detected in the video (480), an alert is transmitted (490).

In another example, a customer is purchasing items at a checkout stand in a retail store. The checkout stand utilizes a POS terminal to perform the transaction. A video source monitors the POS terminal and the area surrounding the POS terminal. When the transaction begins, a POS server sends a signal to an integration system indicating a transaction has started at the POS terminal. The integration system combines video of the transaction with information from the POS system indicating information about the items purchased including the number of items purchased. A video analysis system processes the video to determine the number of items the customer actually leaves with using one or more image processing algorithms. The video analysis system compares the item count determined from the video with the item count information embedded in the video by the integration system to determine if they match. If they are not the same, the operator of the POS terminal may be notified in order to correct the mistake before the customer departs.

Alternately, or in the case of a self checkout station, a store manager or employee near the store exit may be notified of the item consistency rather than the POS terminal operator. The store manager or other employee may be able to make contact with the customer before they leave the store to resolve the discrepancy. The video analysis system may also extract an image of the customer from the video stream and transmit that image along with the discrepancy information so the manager or other employee is able to easily visually identify and make contact with the customer. The notification and customer image could be provided to an employee at the store exit via a user interface of the video analysis system or could be transmitted for delivery to a wireless communication device.

In another example, a documentation check of some type may be desired or required in order to complete certain types of purchases. A store may require its employees to check identification or proof of age for tobacco or alcohol purchases. In this example, a video analysis system monitors all of the activities which are taking place at a POS terminal. A POS server sends an indication to the video analysis system anytime a transaction involving alcohol or tobacco occurs. The video analysis system reviews the captured video of the interaction using various image processing algorithms to determine if identification was received and viewed. If not, the video analysis system may send a warning indicator to a store employee through a user interface or may instruct the POS server to not allow the transaction to be completed.

In another example, a video source monitors a cash drawer in a banking environment, or anywhere cash is exchanged. An integration system receives transaction information from the banking system and integrates that information into video of the activities occurring at the cash drawer. The integrated video is stored in a video storage system. A video analysis system retrieves the integrated video and performs analysis on the integrated video. Image processing algorithms determine the number of bills, or quantity of cash, which is added to or removed from the drawer in each transaction and determine if this matches with the banking system transaction information which is embedded in the video.

In another example, a video system may be used to determine if a particular customer is allowed to charge to an account. The customer may be making a purchase on behalf of a business on a company credit card or may be making a purchase which is being charged to a line of credit account provided by the seller. A POS server is configured to not allow transactions of this nature to be completed by the POS terminal until it receives an affirmative signal from the video analysis system. The video analysis system compares images of the customer captured by the video source against a database of images of customers who are approved to charge to that account. If a positive match of images is not made, the video analysis system indicates to the POS server that the transaction should not be allowed. At that point, a cashier may have to perform some other type of identification check or verification in order to complete the transaction.

In addition to the examples above, video sources may be configured to capture and transmit audio information as well as video. The audio of the transaction or interaction may be processed using audio processing algorithms using methods similar to those described above with respect to the image processing performed by the video analysis system. The results of the audio processing may be used in conjunction with information from POS terminals and POS servers to determine if there are any discrepancies in the transaction, if there was compliance with regulations or requirements, or for other uses.

Even though the examples above are primarily described with respect to product sales, it should be understood that the teachings here may be applied to many other types of product processing situations as well. While POS terminals are most frequently used where product purchases are occurring, similar equipment is used where product returns are processed, in manufacturing environments, in shipping and distribution operations, in repair facilities, and other settings. Even though sales may not be occurring, the same principles taught above may be used in these operations to identify product or process discrepancies by comparing video of the work area to electronic information captured through bar codes, keypads, keyboards, or other methods of data entry.

Figure 6:
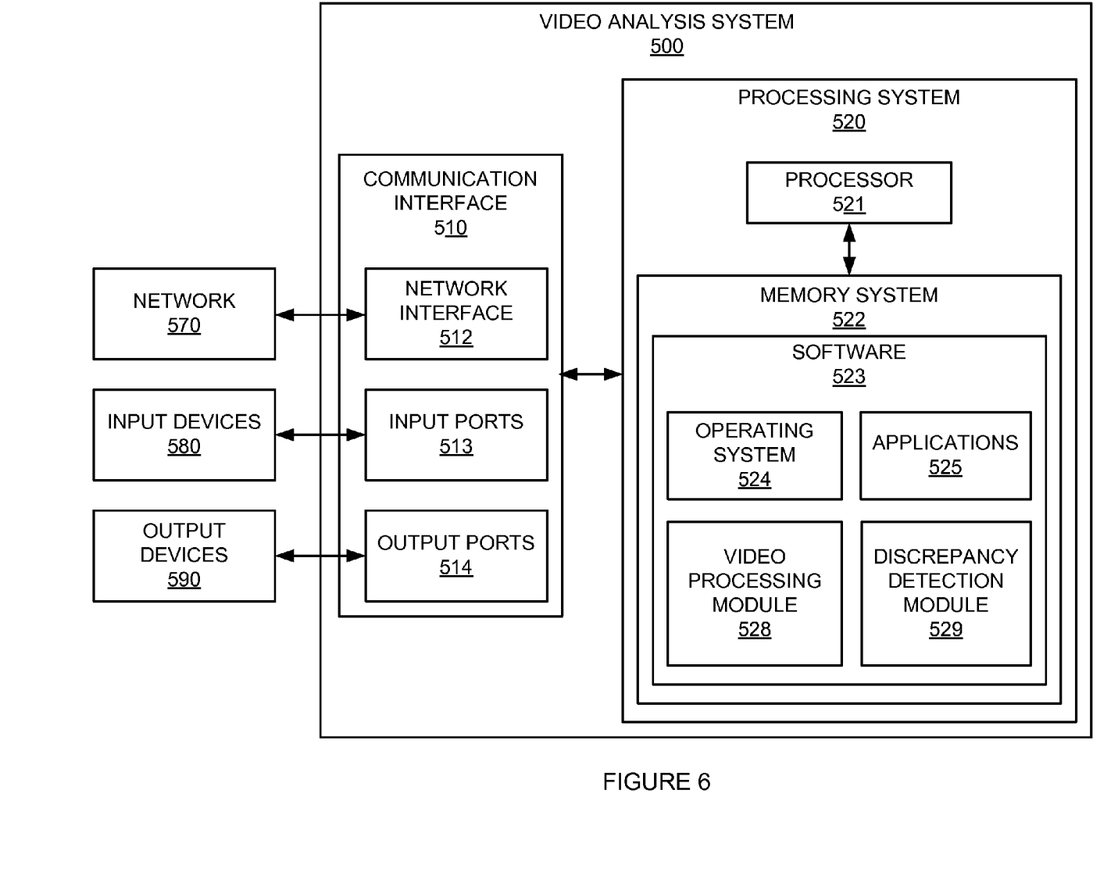
FIG. 6 illustrates a video analysis system.

FIG. 6 illustrates video analysis system 500. Video analysis system 500 includes communication interface 510 and processing system 520. Processing system 520 is linked to communication interface 510 through a communication link. Processing system 520 includes processor 521 and memory system 522.

Communication interface 510 includes network interface 512, input ports 513, and output ports 514. Communication interface 510 includes components that communicate over communication links, such as network cards, ports, RF transceivers, processing circuitry and software, or some other communication device. Communication interface 510 may be configured to communicate over metallic, wireless, or optical links. Communication interface 510 may be configured to use TDM, IP, Ethernet, optical networking, wireless protocols, communication signaling, or some other communication format, including combinations thereof.

Network interface 512 is configured to connect to external devices over network 570. Input ports 513 are configured to connect to input devices 580 such as video storage system 180, user interface 170, or other input devices. Output ports 514 are configured to connect to output devices 590 such as video storage system 180, a display, a printer, or other output devices.

Processor 521 includes microprocessor and other circuitry that retrieves and executes operating software from memory system 522. Memory system 522 comprises software 523. Memory system 522 may be implemented using random access memory, read only memory, a hard drive, a tape drive, flash memory, optical storage, or other memory apparatus.

Software 523 comprises operating system 524, applications 525, video processing module 528, and discrepancy detection module 529. Software 523 may also comprise additional computer programs, firmware, or some other form of non-transitory, machine-readable processing instructions. When executed by processor 521, operating software directs processing system 520 to operate video analysis system 500 to analyze integrated video which includes POS data as described herein using applications 525, video processing module 528, and discrepancy detection module 529.

It should be understood that the functions and features of video analysis system illustrated in FIG. 6 may be implemented in or performed by video analysis system 110, or implemented in other devices including other devices within video system 100 or video system 300.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of performing video content analysis using transactional data to evaluate an employee's performance, the method comprising:
- capturing video of a transaction and the scene at a point-of sale (POS) terminal;
- receiving the video of the transaction as well as POS data from POS system, wherein the transactional data includes a bar code,
- using the bar code information, retrieving information about a product associated with the bar code from a product information database to determine if a documentation check is required;
- providing, if a documentation check is required, a segment of video corresponding to the transaction to a video analysis system analyzing, using the video analysis system, the segment of video to determine if a documentation check has occurred; and
- evaluating an employee's performance using the results of the analysis.

2. The method of claim 1, wherein the segment of video is coupled with audio information.

3. The method of claim 1, wherein the segment of video is stored in a video storage system configured to allow for retrieval for employee training or coaching.

4. A non-transitory computer readable medium having stored thereon program instructions that, when executed by a video processing system to perform video content analysis using transactional data, direct the video processing system to:
- capture video of a transaction and the scene at a point-of sale (POS) terminal;
- receive the video of the transaction as well as POS data from POS system, wherein the transactional data includes a bar code,
- use the bar code information, retrieving information about a product associated with the bar code from a product information database to determine if a documentation check is required;
- provide, if a documentation check is required, a segment of video corresponding to the transaction; analyze, the segment of video to determine if a documentation check has occurred; and
- evaluating an employee's performance using the results of the analysis.

5. The computer readable medium of claim 4, wherein the segment of video is coupled with audio information.

6. The computer readable medium of claim 4, wherein the integrated video is stored in a video storage system configured to allow for retrieval for employee training or coaching.

* * * * *